United States Patent [19]

Schenk et al.

[11] 4,342,366
[45] Aug. 3, 1982

[54] SOIL MULCHER

[75] Inventors: Dale C. Schenk; Harold D. Ralph, both of Hamilton, Canada

[73] Assignee: International Harvester Co., Chicago, Ill.

[21] Appl. No.: 228,045

[22] Filed: Jan. 26, 1981

[51] Int. Cl.³ ............................................. A01B 23/02
[52] U.S. Cl. .................................. 172/643; 172/707; 172/198; 56/400
[58] Field of Search ............... 172/142, 198, 643, 707, 172/708; 56/400

[56] References Cited

U.S. PATENT DOCUMENTS

| | | | |
|---|---|---|---|
| 1,950,834 | 3/1934 | Wyss | 172/643 |
| 2,607,183 | 8/1952 | Happe | 56/400 |
| 2,826,027 | 3/1958 | Melroe | 172/643 |
| 2,990,021 | 6/1961 | Johnson | 172/618 |
| 3,014,335 | 12/1961 | Nolt | 56/400 |
| 3,049,184 | 8/1962 | Lorman | 172/707 |
| 3,774,694 | 11/1973 | Gates | 172/617 |
| 4,127,341 | 11/1978 | Stevens | 172/198 |
| 4,304,306 | 12/1981 | Maust | 172/643 |

FOREIGN PATENT DOCUMENTS 87909  1/1921  Switzerland ........................ 172/707

OTHER PUBLICATIONS

Wil-Rich Mounted Coil Tooth Harrows of Field Cultivators and Chisel Plows 10-15-79—Wil-Rich Inc., Wahpeton, N. Dak.

Primary Examiner—Richard J. Johnson
Attorney, Agent, or Firm—J. J. Getchius; F. D. Au Buchon

[57] ABSTRACT

A mulcher that includes a longitudinal member having one end adapted for connection to a mobile power source, a beam member extending transversely of the connecting member and connected thereto and also having a downwardly opening channel configuration, a generally curved bar located in the channel configuration, a mounting structure for connecting the curved bar to the beam member and a spring tooth structure having a pair of spaced axially aligned coil portions and an intervening connector portion pivotally mounted on the curved bar with a tooth portion extending downwardly from the endmost convolutions of the coil portions. The connector portion engaging the mounting structure when the mulcher is towed and the tooth portions engage the soil with the coil portions winding up on the curved bar. The connector portion moving away from the mounting structure until the tooth portions contact the channel when the mulcher is backed up with the tooth portions in the soil.

9 Claims, 5 Drawing Figures

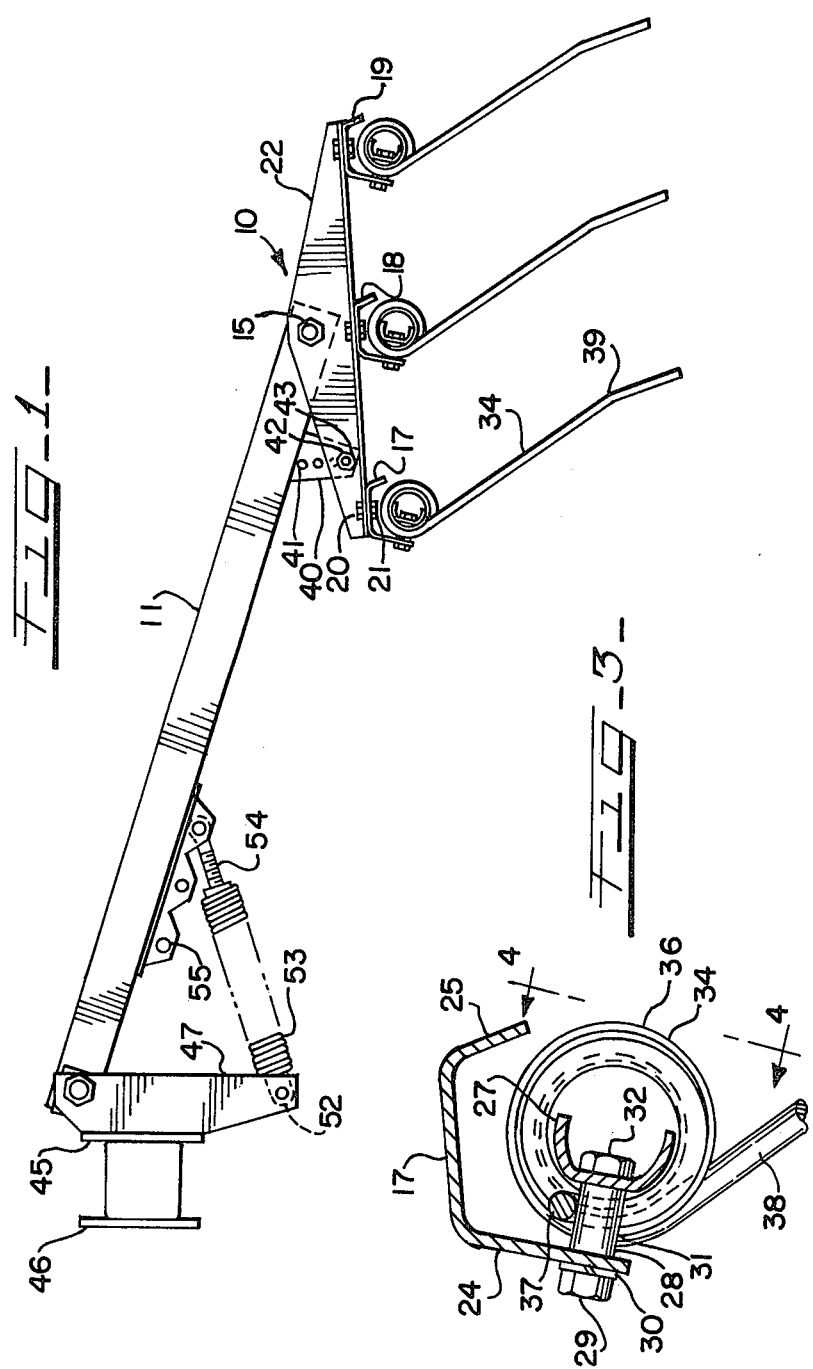

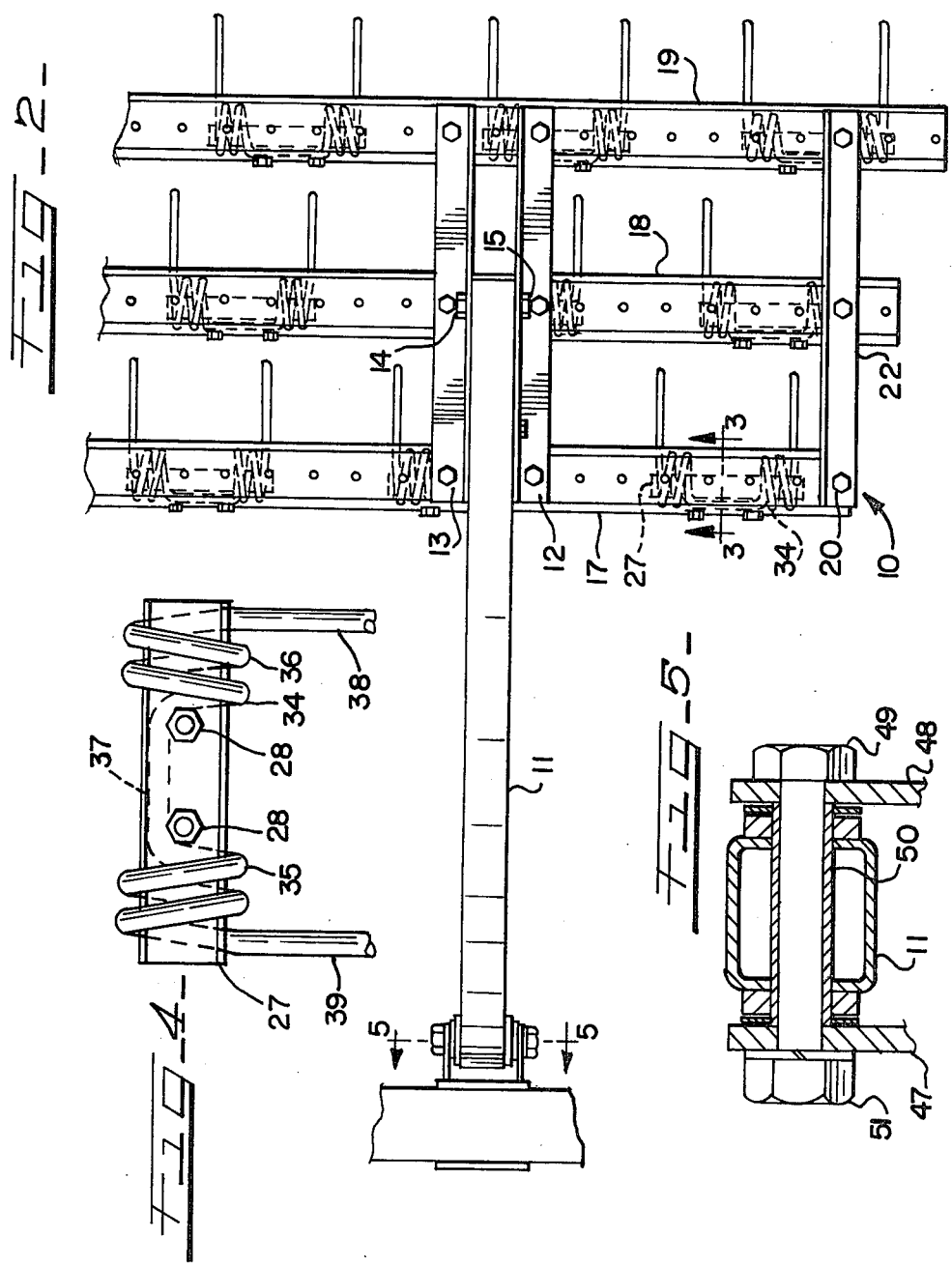

SOIL MULCHER

BACKGROUND OF THE INVENTION

1. Field of the Invention:

This invention pertains generally to agricultural soil conditioning and leveling equipment.

2. Description of the Prior Art:

Known soil mulchers utilize a series of spaced longitudinal members that support a series of transversely mounted, longitudinally spaced elements or pipes having rigidly attached thereto and thereabout spring tooth structures having coil portions with one coil having a downwardly extending single tooth portion, or if dual, spaced and attached coil portions with an intervening portion, and a second tooth portion are used. The tooth portions engage the soil and level and break up lumps of soil left behind tillage equipment. To provide a conditioned area, the tooth structures are laterally spaced in an overlapping pattern on the pipes for the tooth portions to thoroughly work the desired area.

A problem with the pipe type mounting is the requirement of removing several tooth structures to replace a single defective tooth structure. Further, the rigid mounting of the tooth structure to the pipe puts undue stresses on the coil portions where one coil cannot assist the second coil. Backing up of the mulcher with the tooth portions in the ground also highly stresses same.

Where the tooth structures are bolted directly, to channels by means of a clip, one tooth structure can be removed and replaced without changing the others, but backing up of the mulcher tends to generally bend the tooth portions. Also, where the coils are only outwardly restrained by the surrounding channel or angle, the spring action is uncontrolled.

SUMMARY OF THE INVENTION

Applicants have designed a mulcher that generally avoids the difficulties of the prior art and has greatly reduced the incidence of replacement of damaged spring tooth structures. Specifically, Applicants utilize the tooth structure having a pair of spaced axially aligned coil portions having an intervening connector portion therebetween with a tooth portion extending downwardly from each endmost convolution. Further, float of tfhe tooth structure is desired so that one coil portion can assist another under load. Also, a wind up of the coil portion in the mulcher towing position is desired to provide a controlled spring operation. Hence a curved bar in the general configuration of a half of a pipe is utilized with the curved surface providing the wind up surface. The tooth structure is pivotally mounted on the curved bar. A stop element which also serves as a mounting means extends between the wall of a channel facing the prime mover and the curved bar which is located in the channel is a transverse beam that extends the width of the mulcher with the channel walls facing downwardly. One stop element may be utilized but there are preferably two, with each element located where the intervening portion joins a coil portion to laterally restrain movement of the structure in relation to the curved bar. The curved bar is generally coextensive with the tooth structure. Due to the combination stop and mounting means, which preferably consists of a bolt, a sleeve on the bolt between said wall and bar and fastening means of the bolt to the bar, the tooth structure and bar can be quickly removed and replaced with the mounting means without disturbing the other tooth structures. Also due to the float provided for each tooth structure between the stop mounting means and until the tooth portions encounter said wall of the channel, the mulcher can also be backed up for a considerable distance with the tooth portions in the soil without damaging same. Even then, the tooth portions can bend about the channel wall a considerable distance before being damaged.

Thus, Applicants' design achieves a controlled and assisted coil portion windup in towing for an agressive tooth portion vibrating action and a substantial back up capability without bending of the tooth portion with the further advantage of removing and replacing only one tooth structure at a time.

To complete the mulcher, a plurality of transverse channels and spaced tooth structures therefor are utilized. Also provided is a bracket for pivotally connecting the longitudinal members to the transverse members and an adjustment provision therebetween to vary the inclination of the bracket and thus the tooth structures. Further provided is an adjustable, resilient biasing means for biasing the longitudinal member and thus the mulcher downward.

It is, therefore, an object of this invention to provide a new and improved soil mulcher.

Another object of this invetion is to provide a mulcher having a spring loaded working forward motion and a floating backward motion with the tooth structures in the soil.

Another object of this invention is to provide for quick assembly and disassembly of each tooth structure, bar and stop means from the mulcher without disturbance of other similar elements.

BRIEF DESCRIPTION OF THE DRAWINGS

FIG. 1 is a side elevational view of the soil mulcher of this invention;

FIG. 2 is a partial plan view of the mulcher;

FIG. 3 is an enlarged partial sectional view taken along line 3—3 of FIG. 2;

FIG. 4 is a view of the structure taken along line 4—4 of FIG. 3 with the channel removed; and FIG. 5 is a sectional view taken along line 5—5 of FIG. 2.

DESCRIPTION OF THE PREFERRED EMBODIMENT

Referring to FIGS. 1-5, 10 indicates a soil mulcher. Mulcher 10 includes tubular longitudinal member 11. Member 11 at its end rearward and remote from a mobile power source (not shown) is pivotally connected to angle brackets 12 and 13 by bolt 14 and nut 15 extending through suitable apertures in the elements. Brackets 12 and 13 are rigidly connected to transversely extending beams 17, 18, and 19 by bolts 20 and 21. Laterally outwardly located angle brackets 22 (one not shown) provide support for the outer ends of beams 17, 18, and 19 via bolts 20 and 21.

Beams 17, which is typical of the other beams is generally channel shaped and has a downwardy opening configuration. As shown best in FIGS. 3 and 4, the front wall 24 of beam 17 faces toward a mobile power source and extends lower than the rear wall 25. Located between the walls of beam 17 is curved bar 27. Bar 27 is in the general form of a half pipe with its curved surface spaced from, but facing front wall 24. Mounting and stop structure 28 connects curved bar 27 to front wall 24. This structure 28 includes bolt 29 extending through a suitable aperture in wall 24, lockwasher 30 sleeve 31 and nut 32. To provide a square surface, curved bar 27 is flattened where bolt 29 extends therethrough and where same contacts sleeve 31. Nut 32 and bolt 29 generally are located within the confines of the curved bar 27.

Pivotally mounted on curved bar 27 is spring tooth structure 34. Tooth structure 34 which is generally coextensive with curved bar 27, has preferably a pair of spaced, axially aligned coil portions 35 and 36 and connector portion 37. Tooth portion 38 extends downwadly from the endmost convolution of coil portion 36 and 39 from 35 to contact the soil. As shown, preferably two stop structures 28 are utilized with a structure 28 being located adjacent coil portion 36 and coil portion 35. The tooth structures 34 are mounted on beams 17, 18, and 19 in staggered fashion (see FIG. 2) to level the area encompassed by the mulcher.

To vary the angle of the tooth structures on the beams 17, 18, and 19, plate 40 having apertures 41 is rigidly mounted on member 11, Via a bolt 42 and nut 43, extending through aligned holes in brackets 12 and 13 and a selected aperture, the desired angle of the bracket and thus tooth structures can be set and maintained because of the pivotal mounting of the member 11 to the brackets 13 and 14.

To provide a resilient and adjustable connection between the member 11 and a mobile power source, bracket 45 is provided. Via suitable bolts and nut and plate 46, bracket 45 is rigidly attached to a varying transverse beam structures shown. Bracket 45 also has spaced flanges 47 and 48. At the top of bracket 45 (see FIG. 5) bolts 49 extending through the flanges via sleeve 50 therebetween and suitable spacers and nut 51 pivotally connects member 11 via the sleeve to the bracket. At the lower end of bracket 45, pin 52 having extension spring 53 connected thereto which in turn is connected to threaded rod 54 pivotally connected to member 11, biases the mulcher 10 downwardly. The threaded rod allows spring tension adjustment. Further adjustment is provided by holes 55 for varying the connection of rod 54 to member 11.

In operation, with the desired spring tension set of spring 53 and the desired angle of the tooth portions set at apertures 41 via bolt and nut 42, the mulcher is towed over the soil behind possibly a cultivator. As the tooth portions 38 and 39 encounter resistance, they wind up in controlled fashion about curved bar 27 after connector portion 37 has engaged structure 28 and then spring ahead in an agressive vibrating fashion. Due to the pivoting of the tooth structure on the curved bar, each tooth portion, upon wind up, is assisted by the other coil portion if not under load. Should back up of the mulcher with the tooth portions in the soil be required, the tooth structure pivots in a clockwise fashion about the curved bar and away from the structure 28 until a tooth portion is substantially restrained by contact with wall 24 of beam 17. In back up, the coil portions particularly assist each other. Replacement of an individual tooth structure is easily made by removing the two structures 28 (which also restrain lateral movement of the tooth structure) by unthreading nuts 32. The curved bar and tooth structure thereon can then be replaced as needed without affecting the balance of the mulcher.

What is claimed is:

1. A soil mulcher comprising:

(a) a longitudinal connecting member having one end adapted for connection to a mobile power source;
 (b) a beam member extending transversely of said connecting member, said beam member having a downwardly opening generally channel configuration;
 (c) means interconnecting said longitudinal member and said beam member;
 (d) a generally curved bar located in said beam member between said channel configuration and spaced therefrom;
 (e) mounting means for connecting said curved bar to a channel wall facing the mobile power source; and
 (f) a spring tooth structure having a pair of spaced axially aligned coil portions and an intervening connector portion pivotally mounted on said curved bar with said coil portions surrounding said curved bar, said coil portions and said connector portion also being spaced from said channel configuration, said structure having tooth portions extending downwardly from the endmost convolutions of said coil portions, said intervening connector portion engaging said mounting means when the mulcher is towed and said tooth portions engage the soil and said coil portions wind up on said curved bar, said intervening connector portion moving away from said mounting means until said tooth portions adjacent the endmost convolutions contact said channel wall when the mulcher is backed up with the tooth portions in the soil.

2. The mulcher of claim 1 having dual mounting means with each mounting means located adjacent each coil portion.

3. The mulcher of claim 2 in which said curved bar is generally coextensive with said tooth structure.

4. The mulcher of claim 3 in which said curved bar is in the form of substantially a half pipe, and said mounting means extends within the confines of said pipe.

5. The mulcher of claim 4 in which each mounting means includes a bolt extending through said channel wall and said bar, a spacer mounted on said bolt between said wall and said bar and fastening means located within the confines of said pipe.

6. The mulcher of claim 3 in which said interconnecting means is a bracket rigidly connected to said beam and pivotally connected to said longitudinal member and adjustment means between said longitudinal member and said bracket for controlling the inclination of said bracket and hence said tooth structure.

7. The mulcher of claim 6 in which said adjustment means is a plate rigidly connected to said longitudinal member, said plate having a generally vertically extending series of holes and means extending between a selected hole of said series and an aperture in said bracket for securing said plate to said bracket at the desired bracket inclination.

8. The mulcher of claim 7 in which said longitudinal member is pivotally attached to a bracket that is adapted for attachment to a power source and includes adjustable resilient means between said member and bracket for biasing said longitudinal member and therefore said tooth structure downwardly to the soil.

9. The mulcher of claim 8 in which said beam member has a plurality of laterally spaced tooth structures and associated bars and mounting means and said mulcher has a plurality of longitudinally spaced beam members with the tooth structures of the beam members laterally spaced in the direction of travel for leveling the soil contacted.

* * * * *